United States Patent
Inoue

(10) Patent No.: US 12,294,275 B2
(45) Date of Patent: May 6, 2025

(54) VEHICLE DRIVE DEVICE

(71) Applicant: AISIN CORPORATION, Aichi (JP)

(72) Inventor: Ryohei Inoue, Kariya (JP)

(73) Assignee: AISIN CORPORATION, Kariya (JP)

( * ) Notice: Subject to any disclaimer, the term of this patent is extended or adjusted under 35 U.S.C. 154(b) by 239 days.

(21) Appl. No.: 17/908,285

(22) PCT Filed: Mar. 23, 2021

(86) PCT No.: PCT/JP2021/011998
§ 371 (c)(1),
(2) Date: Aug. 31, 2022

(87) PCT Pub. No.: WO2021/205866
PCT Pub. Date: Oct. 14, 2021

(65) Prior Publication Data
US 2023/0113748 A1   Apr. 13, 2023

(30) Foreign Application Priority Data

Apr. 10, 2020   (JP) ................................ 2020-071286

(51) Int. Cl.
*H02K 5/20*        (2006.01)
*B60K 1/00*        (2006.01)
*B60L 53/22*       (2019.01)
*F16H 57/02*       (2012.01)
(Continued)

(52) U.S. Cl.
CPC .............. *H02K 5/203* (2021.01); *B60K 1/00* (2013.01); *B60L 53/22* (2019.02); *H02K 3/50* (2013.01);
(Continued)

(58) Field of Classification Search
CPC ............ H02K 5/20; H02K 5/203; H02K 9/19; H02K 9/193; H02K 3/50; H02K 2203/09; H02K 3/24; H02K 5/225; H02K 9/14; H02K 9/16; B60K 1/00; B60L 53/22; F16H 57/0476; F16H 2057/02034
(Continued)

(56) References Cited

U.S. PATENT DOCUMENTS 8,319,382 B2    11/2012   Isogai et al.
2010/0320853 A1  12/2010   Isogai et al.

FOREIGN PATENT DOCUMENTS

JP    2007-159314 A    6/2007
JP    2009-284660 A   12/2009
(Continued)

OTHER PUBLICATIONS

Machine Translation of JP-2013172486-A (Year: 2013).*
(Continued)

*Primary Examiner* — Thomas Truong
*Assistant Examiner* — Charlie Frank Mann, Jr.
(74) *Attorney, Agent, or Firm* — Oliff PLC

(57) ABSTRACT

A vehicle drive device including a case, a rotary electric machine provided in the case and including power lines 1U, 1V, and 1W electrically connected to a power supply via a power converter (inverter IV), bus bars 7U, 7V, and 7W extending inside the case and joined to the power lines, a hydraulic pump (electric hydraulic pump 72), and an oil passage including ejection holes through which oil discharged from the hydraulic pump is ejected toward at least one of the power lines and the bus bars.

8 Claims, 8 Drawing Sheets

(51) Int. Cl.
*F16H 57/04* (2010.01)
*H02K 3/50* (2006.01)
*H02K 9/193* (2006.01)
*H02K 11/33* (2016.01)

(52) U.S. Cl.
CPC ............ *H02K 9/193* (2013.01); *H02K 11/33* (2016.01); *F16H 2057/02034* (2013.01); *F16H 57/0476* (2013.01); *H02K 2203/09* (2013.01)

(58) Field of Classification Search
USPC .............................................. 310/54, 61, 71
See application file for complete search history.

(56) References Cited

FOREIGN PATENT DOCUMENTS

| JP | 2010-051131 | A | | 3/2010 | |
|---|---|---|---|---|---|
| JP | 2011-004523 | A | | 1/2011 | |
| JP | 2011-234590 | A | | 11/2011 | |
| JP | 2013172486 | A | * | 9/2013 | |
| JP | 2015-204650 | A | | 11/2015 | |
| JP | 2017-011949 | A | | 1/2017 | |
| JP | 2019-205314 | A | | 11/2019 | |
| WO | WO-2018225877 | A1 | * | 12/2018 | ............... H02K 5/04 |
| WO | WO-2019208421 | A1 | * | 10/2019 | |

OTHER PUBLICATIONS

Machine Translation of WO-2018225877-A1 (Year: 2018).*
Machine Translation of WO_2019208421_A1 (Year: 2019).*
May 25, 2021 International Search Report issued in International Patent Application No. PCT/JP2021/011998.
Jun. 13, 2023 Extended European Search Report issued in European Patent Application No. 21784517.1.

* cited by examiner

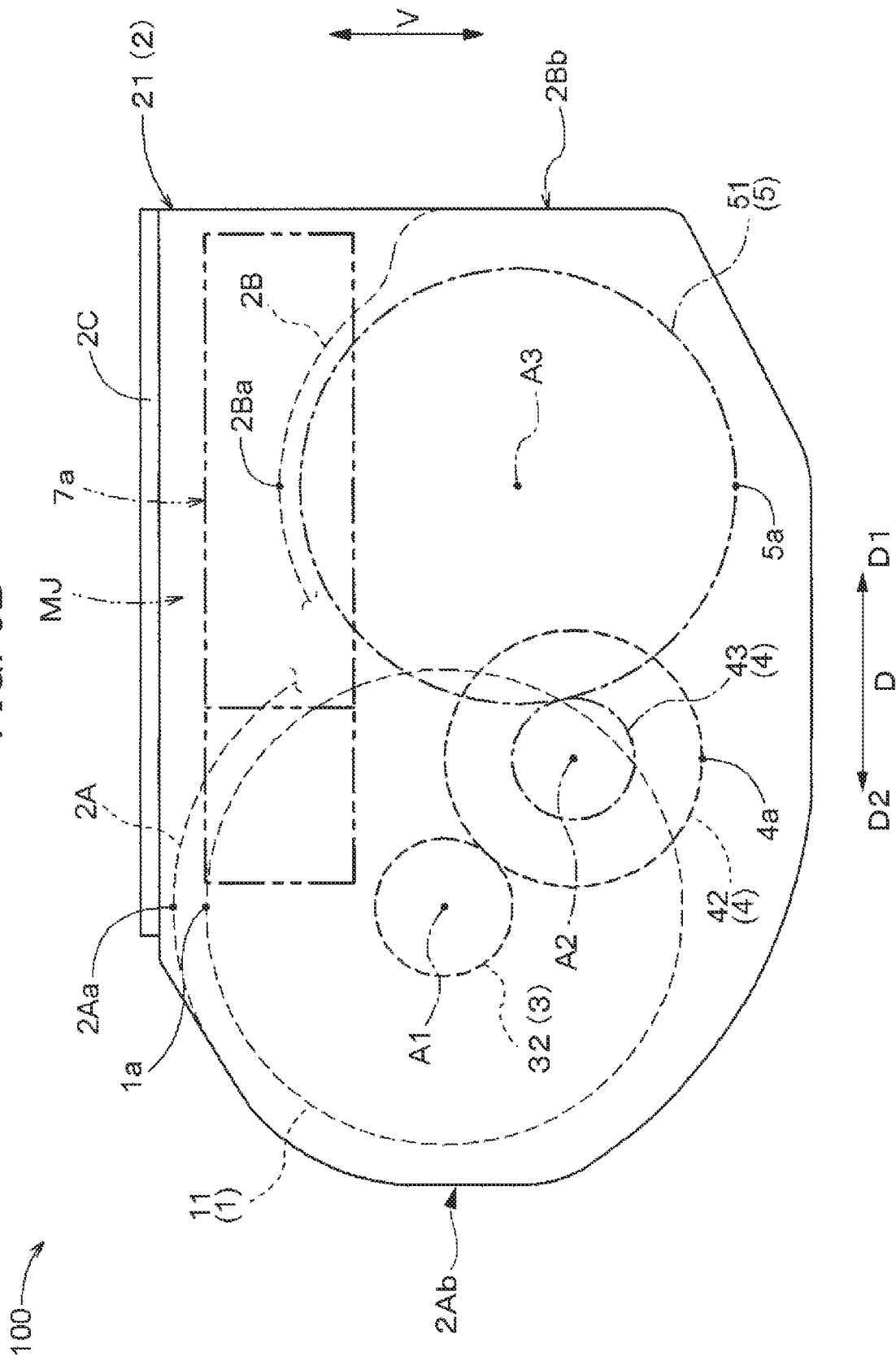

VEHICLE DRIVE DEVICE

TECHNICAL FIELD

The present disclosure relates to a vehicle drive device.

BACKGROUND ART

There is known a technology in which lubricating oil in a case is supplied to a terminal block by being stirred up by a differential gear mechanism. In this technology, the terminal block is arranged in an oil passage where the stirred-up oil flows downward by gravity, thereby cooling the terminal block by the oil flowing through the passage.

RELATED ART DOCUMENTS

Patent Documents

Patent Document 1: Japanese Unexamined Patent Application Publication No. 2007-159314 (JP 2007-159314 A)

SUMMARY OF THE DISCLOSURE

Problem to be Solved by the Disclosure

A member that holds a part of a bus bar (referred to herein as "terminal block") connecting a power line of a rotary electric machine and a power converter is supported by a case of the rotary electric machine. If the heat of the bus bar is not easily released into the air in a bus bar path from the case to the power converter, the temperature of the terminal block is likely to increase. To prevent such temperature increase in the terminal block, it is effective to securely supply cooling oil to the power line and the bus bar that affect the temperature increase in the terminal block.

In this regard, the terminal block is confined in the oil passage in the related art described above. Therefore, efficient release of the heat of the terminal block into the air cannot be expected (the volume in the passage is relatively small and the temperature of air in the closed passage tends to increase). Accordingly, the amount of sufficient oil to be supplied to the terminal block tends to increase. In addition, it is difficult to form a passage for securing a sufficient amount of oil flow that reaches the terminal block. Therefore, the cooling of the terminal block may be insufficient.

In one aspect, the present disclosure has an object to facilitate supply of a sufficient amount of oil to a power line and a bus bar.

Means for Solving the Problem

One aspect of the present disclosure provides a vehicle drive device including:
- a case;
- a rotary electric machine provided in the case and including a power line electrically connected to a power supply via a power converter;
- a bus bar extending inside the case and joined to the power line;
- a hydraulic pump; and
- an oil passage including an ejection hole through which oil discharged from the hydraulic pump is ejected toward at least one of the power line and the bus bar.

Effects of the Disclosure

According to the present disclosure, it is possible to facilitate the supply of a sufficient amount of oil to the power line and the bus bar.

BRIEF DESCRIPTION OF THE DRAWINGS

FIG. 3B is a schematic sectional view perpendicular to the axial direction of the vehicle drive device.

MODES FOR CARRYING OUT THE DISCLOSURE

Hereinafter, each embodiment will be described in detail with reference to the accompanying drawings.

Figure 1:
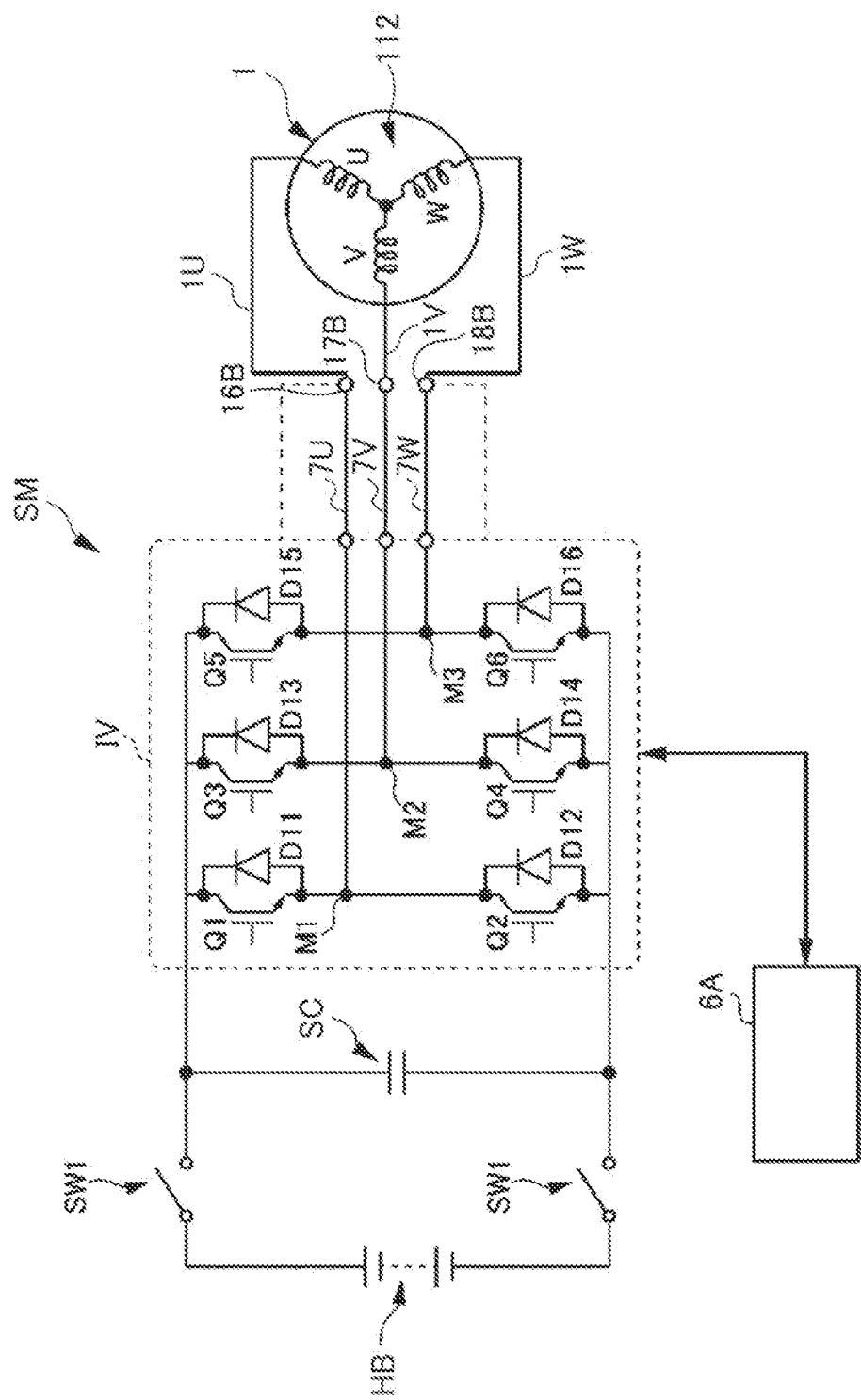
FIG. 1 is a diagram showing an example of an overall structure of a motor drive system.

Prior to description of a vehicle drive device according to the present embodiment, a motor drive system SM for an electric vehicle to which the vehicle drive device according to the present embodiment is preferably applied will be described first. In the description of FIG. 1 regarding the motor drive system SM for the electric vehicle, the term "connection" between various elements means "electrical connection" unless otherwise specified.

FIG. 1 is a diagram showing an example of an overall structure of the motor drive system SM. The motor drive system SM is a system that drives a vehicle by driving a rotary electric machine 1 using electric power of a high-voltage battery HB. As long as the electric vehicle travels by driving the rotary electric machine 1 using electric power, details of its system and structure are arbitrary. The electric vehicle typically includes a hybrid vehicle whose power source is an engine and the rotary electric machine 1, and a battery electric vehicle whose power source is only the rotary electric machine 1. Hereinafter, the vehicle refers to a vehicle including the motor drive system SM unless otherwise specified.

As shown in FIG. 1, the motor drive system SM includes the high-voltage battery HB (an example of a power supply), a smoothing capacitor SC, an inverter IV (an example of a power converter), the rotary electric machine 1, and an inverter control device 6A.

The high-voltage battery HB is an arbitrary power storage device that stores electric power and outputs a direct-current voltage, and may include a capacitive element such as a nickel-metal hydride battery, a lithium ion battery, or an electric double-layer capacitor. The high-voltage battery HB is typically a battery having a rated voltage of higher than 100 V, for example, having a rated voltage of 288 V.

The inverter IV includes U-phase, V-phase, and W-phase arms arranged in parallel to each other between a positive electrode line and a negative electrode line. The U-phase arm includes a series connection of switching elements (IGBTs: Insulated Gate Bipolar Transistors in this example)

Q1 and Q2. The V-phase arm includes a series connection of switching elements (IGBTs in this example) Q3 and Q4. The W-phase arm includes a series connection of switching elements (IGBTs in this example) Q5 and Q6. Diodes D11 to D16 are arranged between collectors and emitters of the switching elements Q1 to Q6, respectively, to allow a current to flow from the emitter side to the collector side. The switching elements Q1 to Q6 may be switching elements other than the IGBTs, such as MOSFETs (metal oxide semiconductor field-effect transistors).

The rotary electric machine 1 is, for example, a three-phase alternating-current motor, and first ends of three coils of the U, V, and W phases are connected in common at a neutral point. A second end of the U-phase coil is connected to a midpoint M1 of the switching elements Q1 and Q2. A second end of the V-phase coil is connected to a midpoint M2 of the switching elements Q3 and Q4. A second end of the W-phase coil is connected to a midpoint M3 of the switching elements Q5 and Q6. The smoothing capacitor SC is connected between the collector of the switching element Q1 and the negative electrode line.

Various sensors such as a current sensor (not shown) for detecting a current flowing through the rotary electric machine 1 are connected to the inverter control device 6A. The inverter control device 6A controls the inverter IV based on sensor information from various sensors. The inverter control device 6A includes, for example, a CPU, a ROM, and a main memory (all of them are not shown), and various functions of the inverter control device 6A are implemented such that a control program recorded in the ROM or the like is read into the main memory and executed by the CPU. The control method for the inverter IV is arbitrary. Basically, the two switching elements Q1 and Q2 related to the U phase are turned ON or OFF in opposite phases, the two switching elements Q3 and Q4 related to the V phase are turned ON or OFF in opposite phases, and the two switching elements Q5 and Q6 related to the W phase are turned ON or OFF in opposite phases.

In the example shown in FIG. 1, the motor drive system SM includes the single rotary electric machine 1, but may include an additional motor (including a generator). In this case, the additional motor(s) together with a corresponding inverter may be connected to the high-voltage battery HB in parallel to the rotary electric machine 1 and the inverter IV. In the example shown in FIG. 1, the motor drive system SM does not include a DC/DC converter, but may include the DC/DC converter between the high-voltage battery HB and the inverter IV.

As shown in FIG. 1, cutoff switches SW1 for cutting off the power supply from the high-voltage battery HB are provided between the high-voltage battery HB and the smoothing capacitor SC. The cutoff switch SW1 may be a semiconductor switch, a relay, or the like. The cutoff switch SW1 is normally ON, and is turned OFF, for example, when a vehicle collision is detected. The ON/OFF switching of the cutoff switch SW1 may be realized by the inverter control device 6A or may be realized by another control device.

Figure 2:
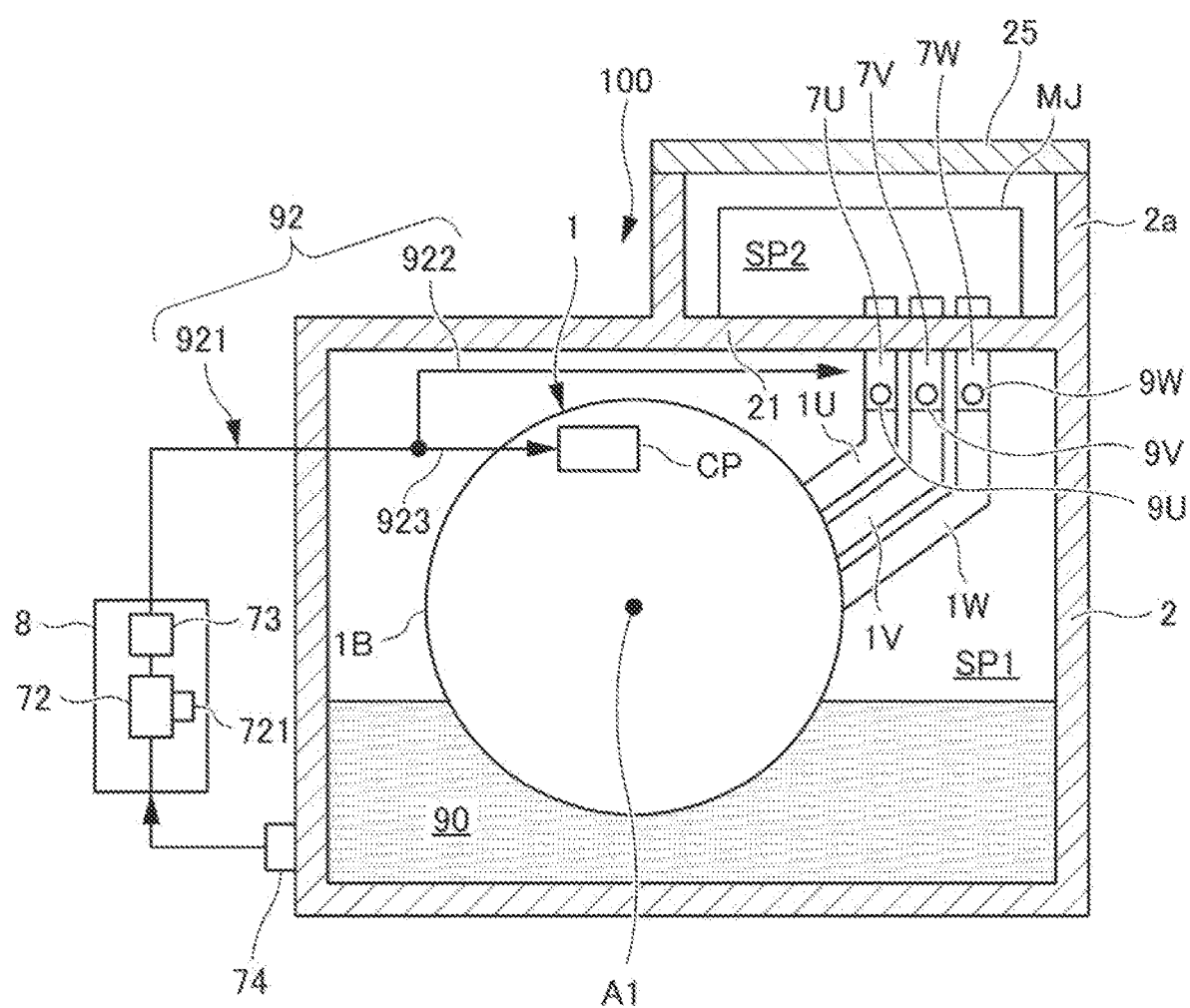
FIG. 2 is a schematic diagram of a vehicle drive device according to an embodiment.

FIG. 2 is a schematic diagram of a vehicle drive device 100 according to the present embodiment. FIG. 2 schematically shows the vehicle drive device 100 in sectional view.

The vehicle drive device 100 includes the rotary electric machine 1, a case 2, bus bars 7U, 7V, and 7W, an oil supply unit 8, and an oil passage 92.

The case 2 houses the rotary electric machine 1 and the like. The case 2 has an oil reservoir 90 in which oil to be used for cooling the rotary electric machine 1 is stored. That is, the case 2 is structured such that the bottom portion thereof is closed and the oil falling due to gravity is stored. The oil in the oil reservoir 90 may be used for lubrication of another drive mechanism (for example, a differential gear mechanism 5) that may be housed in the case 2. In FIG. 2, the outer shape of the cross section of the case 2 is rectangular, but the shape may differ depending on the layout of peripheral members or the like.

In the present embodiment, the case 2 includes, for example, an inverter case portion 2a. The inverter case portion 2a may be formed integrally with the case 2. That is, the inverter case portion 2a is formed integrally with a case member (peripheral wall portion 21) defining a space SP1 that houses the rotary electric machine 1 in such a manner that the inverter case portion 2a is partitioned by the case member.

An inverter module MJ is housed in the inverter case portion 2a. The inverter module MJ is a module incorporating the inverter IV, the inverter control device 6A, and the like, and may further incorporate the smoothing capacitor SC. The inverter case portion 2a is preferably closed to the outside by a lid member 25. That is, the inverter case portion 2a defines a closed space SP2, and the inverter module MJ is arranged in the closed space SP2. As a result, measures for EMC (Electromagnetic Compatibility) related to the inverter module MJ can be realized appropriately, and problems such as spatial resonance can be reduced.

The bus bars 7U, 7V, and 7W are arranged to penetrate the case member (peripheral wall portion 21) that separates the space SP1 and the closed space SP2, and extend into the space SP1 and the closed space SP2. Each of the bus bars 7U, 7V, and 7W has, for example, a plate-like shape (for example, a sheet metal member), but may be realized by a conductor wire having a circular cross section. The bus bars 7U, 7V, and 7W are provided in association with the U phase, V phase, and W phase, respectively, and are joined to power lines 1U, 1V, and 1W of the respective phases from the rotary electric machine 1 (see FIG. 1 as well). FIG. 2 schematically shows junctions 9U, 9V, and 9W between the bus bars 7U, 7V, and 7W and the power lines 1U, 1V, and 1W, respectively. The bus bars 7U, 7V, and 7W and the power lines 1U, 1V, and 1W may be joined by, for example, tightening bolts, respectively.

First ends of the bus bars 7U, 7V, and 7W are joined to the power lines 1U, 1V, and 1W inside the case 2, and second ends are joined to bus bars (not shown) on the inverter IV side in the inverter module MJ outside the case 2, respectively. The bus bars 7U, 7V, and 7W may extend to the midpoints M1, M2, and M3 of the inverter IV (see FIG. 1), or may electrically be connected to the midpoints M1, M2, and M3 of the inverter IV via other bus bars, respectively.

The bus bars 7U, 7V, and 7W may be sealed by a resin portion (not shown) in such a manner that portions forming the junctions 9U, 9V, and 9W are exposed. In this case, the resin portion may be fixed to the case 2 to hold the bus bars 7U, 7V, and 7W. In FIG. 2, the bus bars 7U, 7V, and 7W are supported on an upper portion of the case 2, but may be supported on a side portion of the case 2. The resin portion may define partition portions (not shown) between the junctions 9U, 9V, and 9W to efficiently secure a creepage distance between the bus bars 7U, 7V, and 7W (or between the junctions 9U, 9V, and 9W).

Figure 3A:
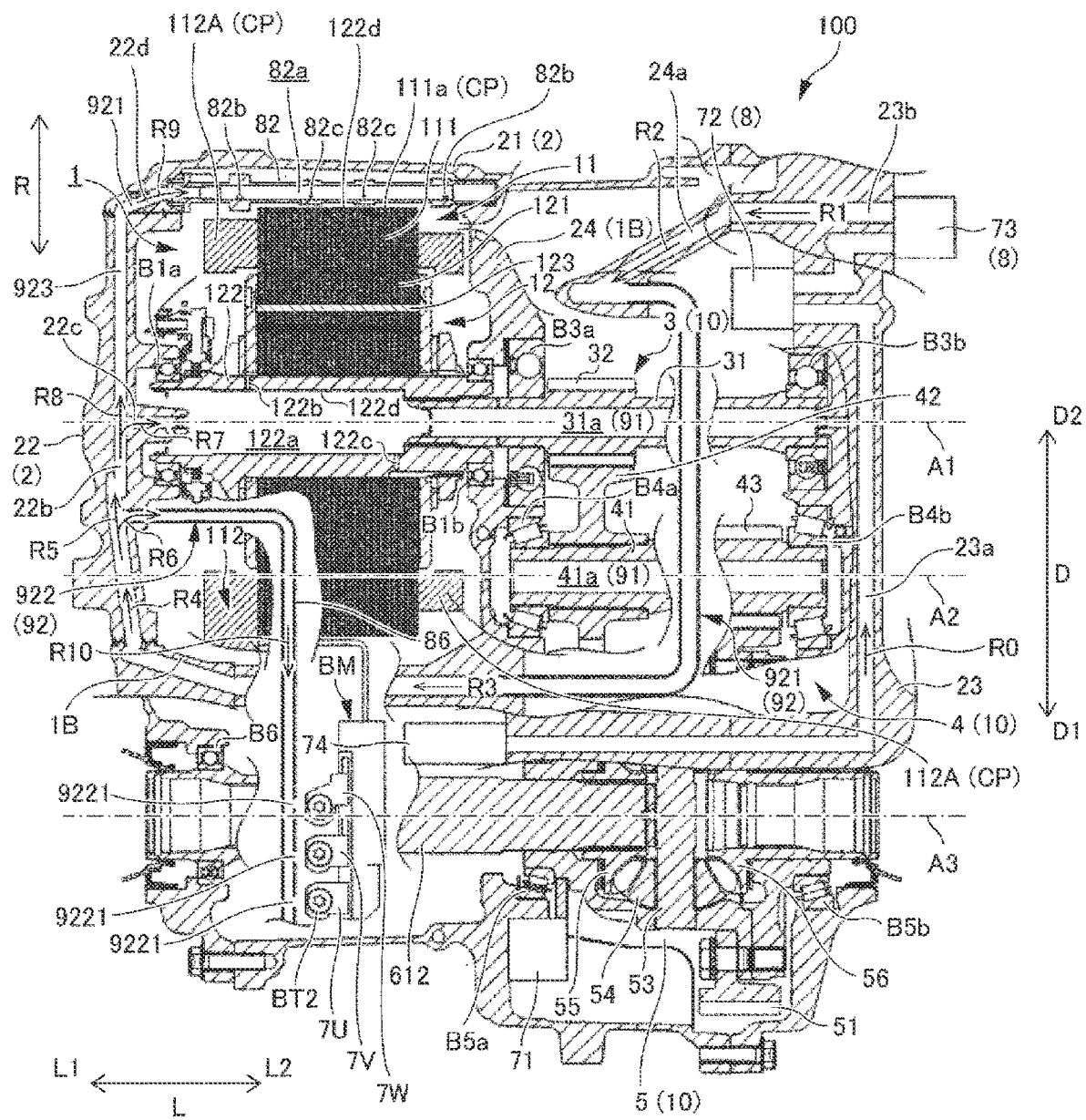
FIG. 3A is a sectional view taken along an axial direction of the vehicle drive device.

The power lines 1U, 1V, and 1W from the rotary electric machine 1 are joined to a coil 112 (see FIG. 1) wound around a stator core 111 (not shown in FIG. 2; see FIG. 3A). Alternatively, the power lines 1U, 1V, and 1W may be formed as a part of the coil 112 of the stator core 111. The power lines 1U, 1V, and 1W may be the same coil wires (for example, flat wires) as those of the coil 112 of the stator core 111. Alternatively, the power lines 1U, 1V, and 1W may have plate-like shapes (for example, sheet metal members) similar to the bus bars 7U, 7V, and 7W, or may be realized by conductor wires each having a circular cross section. Other bus bars (intermediate bus bars) may be interposed between the power lines 1U, 1V, and 1W and the bus bars 7U, 7V, and 7W, respectively. In this case, the intermediate bus bars may also be sealed by the resin portion and may be fixed to the case 2.

The power lines 1U, 1V, and 1W extend to the outside of a motor case 1B. In this case, the power lines 1U, 1V, and 1W and the bus bars 7U, 7V, and 7W preferably extend into air in the case 2. That is, the power lines 1U, 1V, and 1W and the bus bars 7U, 7V, and 7W are positioned above the oil reservoir 90. In this case, only a part of the power lines 1U, 1V, and 1W and the bus bars 7U, 7V, and 7W may be positioned above the oil reservoir 90, or the whole may be positioned above the oil reservoir 90. In this case, it is possible to prevent inconveniences such as a case where foreign matter that may be mixed in the oil stored in the oil reservoir 90 adheres to the power lines 1U, 1V, and 1W and the bus bars 7U, 7V, and 7W. Further, it is possible to reduce a possibility of corrosion of the junctions 9U, 9V, and 9W and the like between the power lines 1U, 1V, and 1W and the bus bars 7U, 7V, and 7W.

The oil supply unit 8 includes an electric hydraulic pump 72 and an oil cooler 73. The electric hydraulic pump 72 includes a pump motor 721 that is a motor different from the rotary electric machine 1. At the time of operation, the electric hydraulic pump 72 sucks the oil in the oil reservoir 90 and discharges the sucked oil toward the oil passage 92 via the oil cooler 73. As a result, the oil cooled by passing through the oil cooler 73 is discharged to the oil passage 92. The oil cooler 73 may be provided on the suction side with respect to the electric hydraulic pump 72.

The electric hydraulic pump 72 preferably sucks the oil in the oil reservoir 90 through a strainer 74. In this case, it is possible to prevent foreign matter that may be mixed in the oil from being discharged into the oil passage 92.

The oil passage 92 is connected to the electric hydraulic pump 72 to pump the oil discharged from the electric hydraulic pump 72. As schematically shown in FIG. 2, the oil passage 92 includes a cooling oil passage 921 and a second branch oil passage 922 (an example of a second oil passage portion). An oil passage portion of the cooling oil passage 921 after a branch point from the second branch oil passage 922 is also referred to as "third branch oil passage 923" (an example of a third oil passage portion). An oil passage portion of the cooling oil passage 921 on an upstream side (electric hydraulic pump 72 side) with respect to the branch point from the second branch oil passage 922 is an example of a first oil passage portion.

The cooling oil passage 921 supplies the oil toward a cooling target portion CP inside the rotary electric machine 1. The inside of the rotary electric machine 1 refers to a portion of the rotary electric machine 1 housed in the motor case 1B. The motor case 1B houses various components (described later) of the rotary electric machine 1. The cooling target portion CP is arranged inside the rotary electric machine 1. The cooling target portion CP may optionally include a coil end portion 112A and a rotor core 121 (and permanent magnets 123 provided in the rotor core 121) described later. The case 2 may define a part of the motor case 1B.

The cooling oil passage 921 extends to the inside of the case 2. In particular, the cooling oil passage 921 extends to the inside of the rotary electric machine 1 in the case 2. The cooling oil passage 921 may have a portion extending to the outside of the case 2. The cooling oil passage 921 may be formed in the motor case 1B inside the rotary electric machine 1, or may be formed by any other specific component of the rotary electric machine 1 (for example, a rotor shaft 122). The cooling oil passage 921 outside the rotary electric machine 1 may be formed by a tubular member or may be formed in the case 2 and/or another case.

The second branch oil passage 922 communicates with the cooling oil passage 921. The second branch oil passage 922 may communicate with the cooling oil passage 921 in an arbitrary manner as long as a part of the oil discharged from the electric hydraulic pump 72 is supplied. For example, as shown in FIG. 2, the second branch oil passage 922 may communicate with the cooling oil passage 921 by branching on an upstream side (a side closer to the oil supply unit 8) with respect to a section of the cooling oil passage 921 arranged inside the rotary electric machine 1. Although illustration is omitted, the second branch oil passage 922 may alternatively communicate with the cooling oil passage 921 by branching within the section of the cooling oil passage 921 arranged inside the rotary electric machine 1, or may communicate with the cooling oil passage 921 by being continuous on a downstream side with respect to this section.

The second branch oil passage 922 supplies the oil toward at least one of the power lines 1U, 1V, and 1W and the bus bars 7U, 7V, and 7W. For example, the second branch oil passage 922 may supply the oil only to the power lines 1U, 1V, and 1W, may supply the oil only to the bus bars 7U, 7V, and 7W, or may supply the oil both to the power lines 1U, 1V, and 1W and to the bus bars 7U, 7V, and 7W. The power lines 1U, 1V, and 1W and the bus bars 7U, 7V, and 7W are joined together in the respective phases, and heat is transferred in the respective phases. Therefore, both the power lines 1U, 1V, and 1W and the bus bars 7U, 7V, and 7W can be cooled even if only one side of the power lines 1U, 1V, and 1W and the bus bars 7U, 7V, and 7W is cooled. However, the second branch oil passage 922 preferably supplies the oil both to the power lines 1U, 1V, and 1W and to the bus bars 7U, 7V, and 7W. For example, the second branch oil passage 922 may supply the oil to the junctions 9U, 9V, and 9W between the power lines 1U, 1V, and 1W and the bus bars 7U, 7V, and 7W.

The second branch oil passage 922 extends inside the case 2. The second branch oil passage 922 extends outside the rotary electric machine 1. The second branch oil passage 922 may be formed by a tubular member or may be formed in the case 2 and/or another case similarly to the cooling oil passage 921. The second branch oil passage 922 may be realized by a combination of an oil passage formed by a tubular member and an oil passage formed in the case 2 and/or another case.

As described above, according to the present embodiment, the oil discharged from the oil supply unit 8 is not only supplied to the cooling target portion CP of the rotary electric machine 1 via the cooling oil passage 921, but also supplied to the power lines 1U, 1V, and 1W and the bus bars 7U, 7V, and 7W via the second branch oil passage 922. As a result, the power lines 1U, 1V, and 1W and the bus bars 7U, 7V, and 7W can effectively be cooled by using the oil supplied to the cooling target portion CP of the rotary electric machine 1.

The power lines 1U, 1V, and 1W and the bus bars 7U, 7V, and 7W are paths of a large current flowing between the high-voltage battery HB and the rotary electric machine 1.

Therefore, the temperature is likely to be relatively high. When the temperature of the power lines 1U, 1V, and 1W and the bus bars 7U, 7V, and 7W is relatively high, the atmospheric temperature in the case 2 increases. Accordingly, it may be necessary to increase the cooling performance for the rotary electric machine 1 and the like. When the temperature of the power lines 1U, 1V, and 1W and the bus bars 7U, 7V, and 7W is relatively high, heat is transferred to the inverter module MJ. Therefore, it may be necessary to increase the cooling performance for the inverter module MJ. Particularly in the case where the inverter case portion 2a where the inverter module MJ is arranged defines the closed space SP2, the inverter module MJ is not exposed to outside air. Therefore, the heat of the inverter module MJ is not easily released into the air. In the case where the inverter case portion 2a is formed integrally with the case 2, the bus bars 7U, 7V, and 7W are not exposed to the outside air. Therefore, the heat of the bus bars 7U, 7V, and 7W is not easily released into the air. In such a case, the need to increase the cooling performance for the bus bars 7U, 7V, and 7W and the inverter module MJ is likely to increase.

In this regard, according to the present embodiment, the power lines 1U, 1V, and 1W and the bus bars 7U, 7V, and 7W can be cooled by the oil supplied via the second branch oil passage 922 as described above. Thus, the atmospheric temperature in the case 2 can be reduced effectively. As a result, it is possible to prevent excess of the cooling function related to the rotary electric machine 1 and the like. The inverter module MJ can release the heat to the oil via the bus bars 7U, 7V, and 7W. Therefore, it may be possible to simplify and reduce the cooling function on the inverter module MJ side. For example, the size of a coolant flow path (not shown) provided for the inverter IV may be reduced. Thus, according to the present embodiment, it is possible to realize efficient oil cooling for the entire vehicle drive device 100 by utilizing the oil from the electric hydraulic pump 72.

According to the present embodiment, the oil to be used for cooling the power lines 1U, 1V, and 1W and the bus bars 7U, 7V, and 7W is the oil cooled by the oil cooler 73 as described above. Therefore, it is possible to efficiently cool the power lines 1U, 1V, and 1W and the bus bars 7U, 7V, and 7W together with the cooling target portion CP inside the rotary electric machine 1. Thus, according to the present embodiment, the power lines 1U, 1V, and 1W and the bus bars 7U, 7V, and 7W can be cooled in a desired manner even if the amount of the oil to be used for cooling the power lines 1U, 1V, and 1W and the bus bars 7U, 7V, and 7W is relatively small. In other words, a coolable amount of oil can be supplied in a desired manner to the power lines 1U, 1V, and 1W and the bus bars 7U, 7V, and 7W together with the cooling target portion CP inside the rotary electric machine 1 without excessively increasing the discharge amount of the electric hydraulic pump 72.

The heat generation timings are the same for the cooling target portion CP (particularly a stator 11) inside the rotary electric machine 1 and for the power lines 1U, 1V, and 1W and the bus bars 7U, 7V, and 7W. In this regard, in the present embodiment, the second branch oil passage 922 branches from the cooling oil passage 921 for cooling the cooling target portion CP. Therefore, the power lines 1U, 1V, and 1W and the bus bars 7U, 7V, and 7W can efficiently be cooled by the oil flowing through the second branch oil passage 922. Further, the electric hydraulic pump 72 serves as the hydraulic source. Therefore, efficient cooling can be realized, for example, by turning ON the electric hydraulic pump 72 when the heat generation of the cooling target portion CP, the power lines 1U, 1V, and 1W, and the bus bars 7U, 7V, and 7W is relatively large, and by turning OFF the electric hydraulic pump 72 when the heat generation is relatively small. Thus, according to the present embodiment, two or more objects having the same heat generation timing (cooling target portion CP, power lines 1U, 1V, and 1W, and bus bars 7U, 7V, and 7W) can efficiently be cooled by the oil from the common electric hydraulic pump 72. For example, assuming two objects having different heat generation timings, there may occur a situation in which the required cooling level of one object is relatively high but the required cooling level of the other object is relatively low. If the electric hydraulic pump 72 is turned ON to meet the relatively high required cooling level of the one object under such circumstances, inefficiency such as unnecessary cooling of the other object occurs. If the electric hydraulic pump 72 is turned OFF to meet the relatively low required cooling level of the other object under such circumstances, on the other hand, there is such an inconvenience that the temperature of the one object increases. According to the present embodiment, such inefficiency and inconvenience can be prevented.

According to the present embodiment, the oil to be supplied to the power lines 1U, 1V, and 1W and the bus bars 7U, 7V, and 7W is not the oil after the cooling of the cooling target portion CP but is the oil having substantially the same temperature as that of the oil for cooling the cooling target portion CP. Therefore, the power lines 1U, 1V, and 1W and the bus bars 7U, 7V, and 7W can be cooled efficiently.

If the amount of the oil to be used for cooling the power lines 1U, 1V, and 1W and the bus bars 7U, 7V, and 7W in the amount of the oil discharged from the electric hydraulic pump 72 of the oil supply unit 8 is excessively larger than the amount of the oil to be supplied to the cooling target portion CP inside the rotary electric machine 1, the cooling target portion CP inside the rotary electric machine 1 cannot be cooled appropriately. Therefore, assuming that the amount of the oil discharged from the oil supply unit 8 is "100", the amount of the oil to be used for cooling the power lines 1U, 1V, and 1W and the bus bars 7U, 7V, and 7W is preferably "30" or less (that is, 30% or less), and more preferably "10" or less (that is, 10% or less). Such oil amount adjustment (distribution adjustment) can be realized by adjusting the ratio ($=\alpha 1/\alpha 0$) of a total area $\alpha 1$ of opening holes related to the oil to be used for cooling the power lines 1U, 1V, and 1W and the bus bars 7U, 7V, and 7W, assuming that the total opening area of all the opening holes of the oil passage 92 is $\alpha 0$. That is, assuming that the total area of opening holes related to the oil to be supplied to the cooling target portion CP inside the rotary electric machine 1 is $\alpha 2$, $\alpha 1 + \alpha 2 = \alpha 0$, and distribution of 10% for the cooling of the power lines 1U, 1V, and 1W and the bus bars 7U, 7V, and 7W can be realized when $\alpha 1/\alpha 0 = 0.1$.

In the present embodiment, the oil is ejected toward the power lines 1U, 1V, and 1W and the bus bars 7U, 7V, and 7W as an example. Therefore, when conductive foreign matter is mixed in the oil, the foreign matter may adversely affect electrical characteristics of the power lines 1U, 1V, and 1W and the bus bars 7U, 7V, and 7W. In this regard, in the present embodiment, for example, the oil is supplied to the electric hydraulic pump 72 via the strainer 74 as described above. Therefore, it is possible to reduce the possibility that foreign matter is mixed in the oil to be supplied to the power lines 1U, 1V, and 1W and the bus bars 7U, 7V, and 7W. As a result, it is possible to reduce the possibility that the foreign matter that may be mixed in the oil adversely affects the electrical characteristics of the power lines 1U, 1V, and 1W and the bus bars 7U, 7V, and 7W (for example, the possibility of conduction between the phases due to the conductive foreign matter).

Next, an example of a mechanical structure of the vehicle drive device 100 and an oil flow in the vehicle drive device 100 will be described as a more specific embodiment with reference to FIGS. 3A to 6.

Figure 3C:
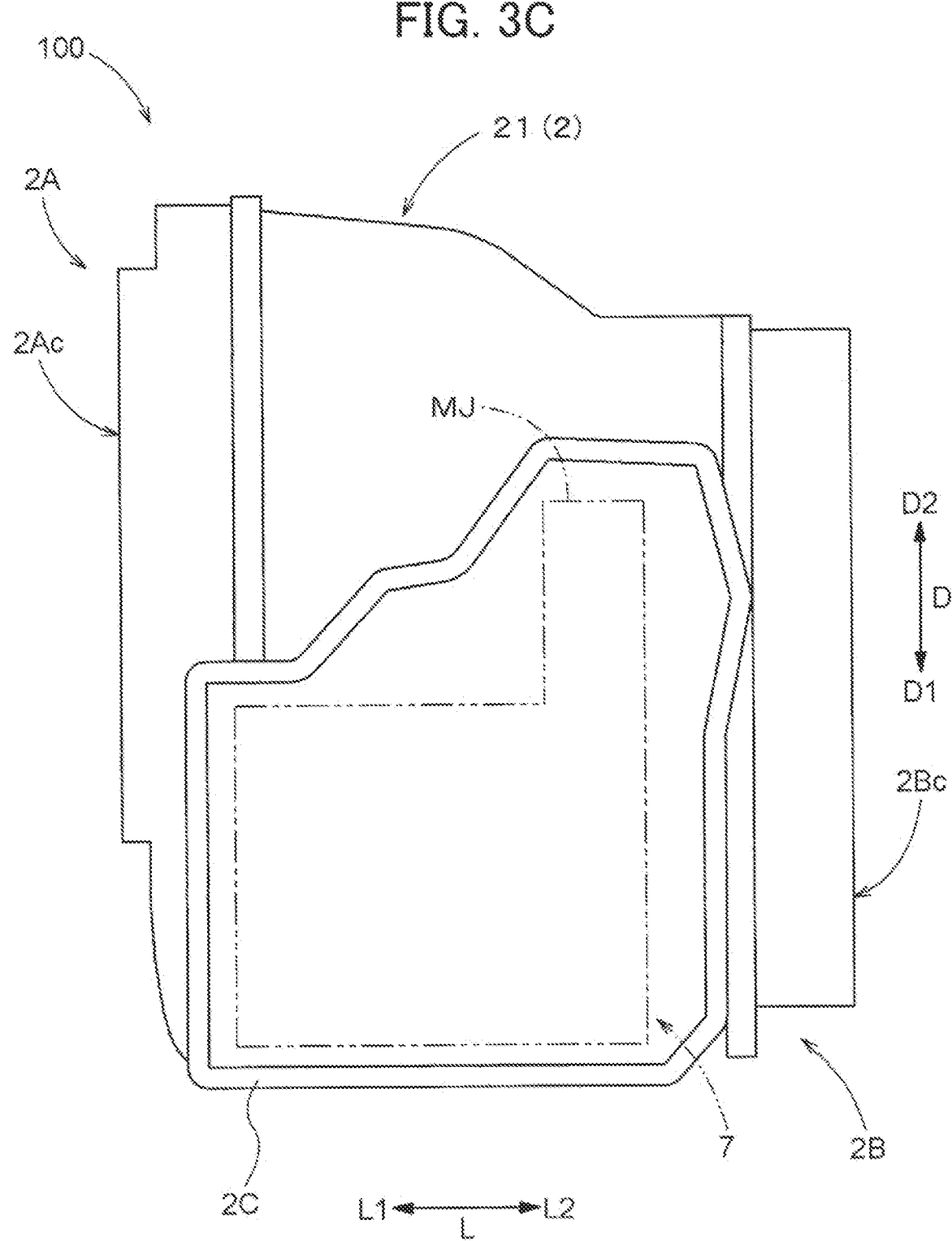
FIG. 3C is a plan view schematically showing an inverter module housed in a third housing portion.
Figure 4:
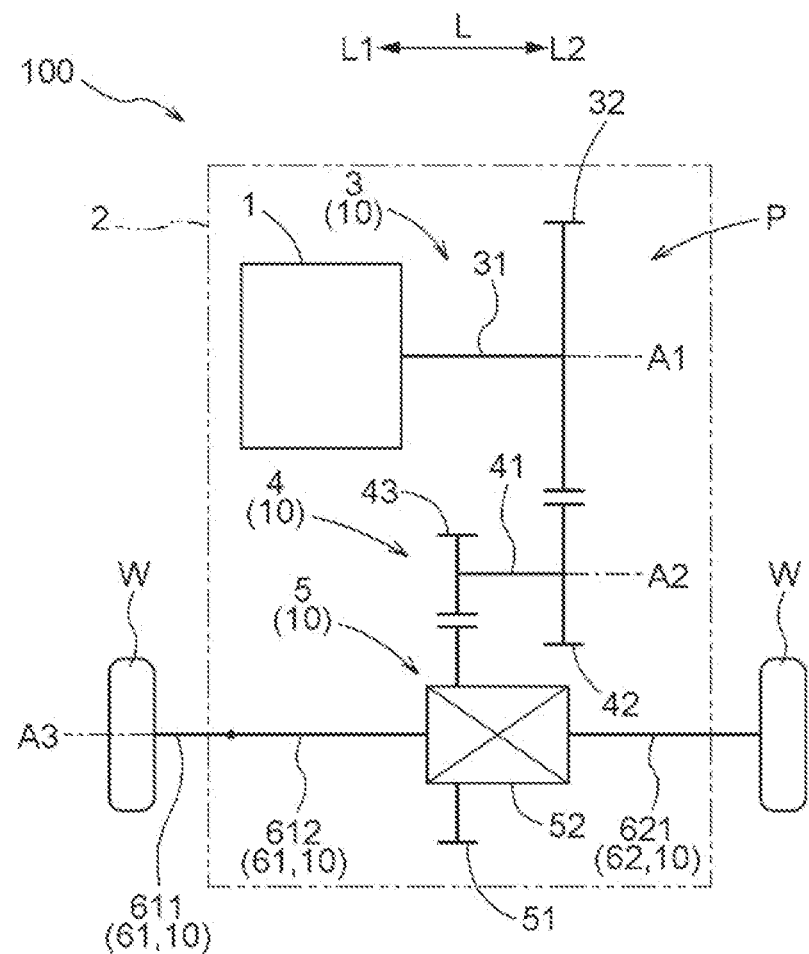
FIG. 4 is a skeleton diagram of the vehicle drive device.
Figure 5:
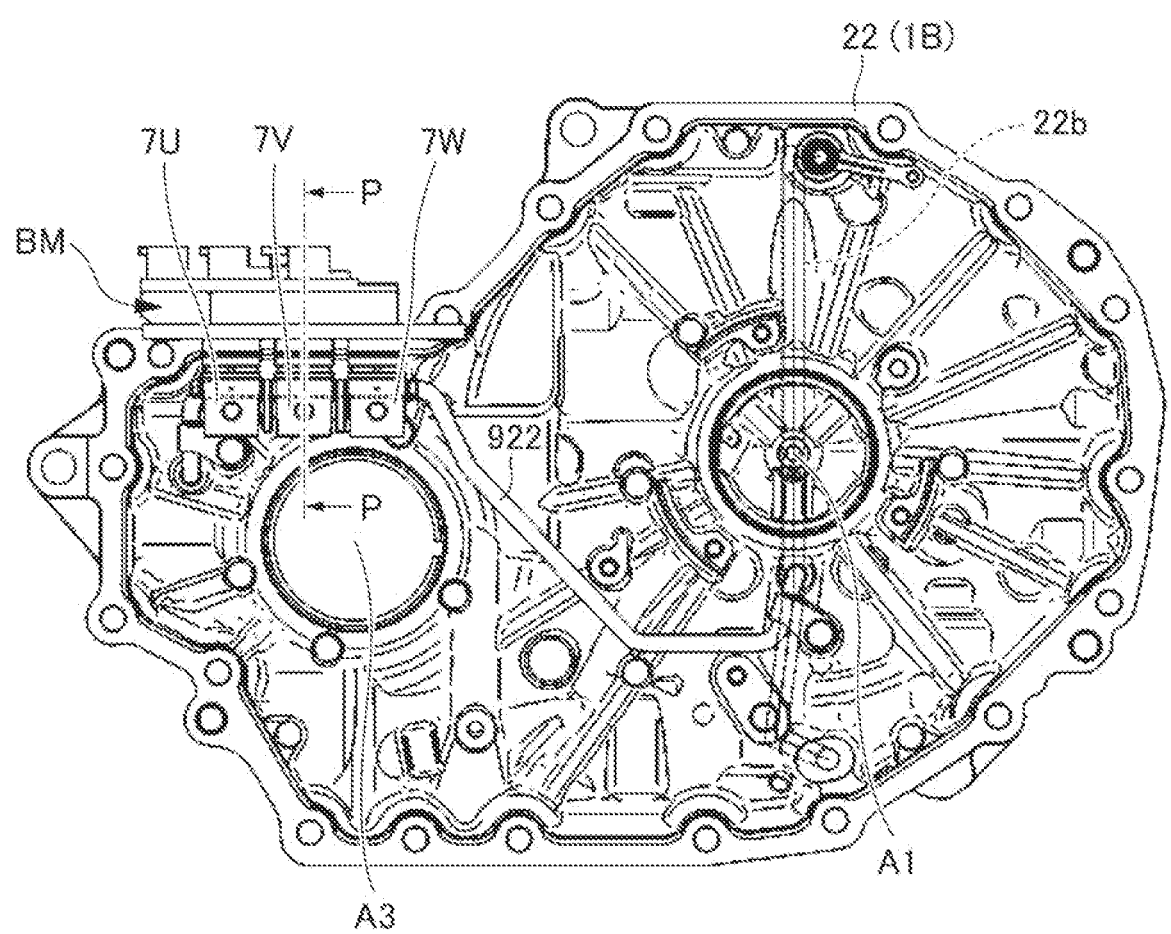
FIG. 5 is an explanatory diagram showing a layout example of a branch oil passage shown in FIG. 3A.
Figure 6:
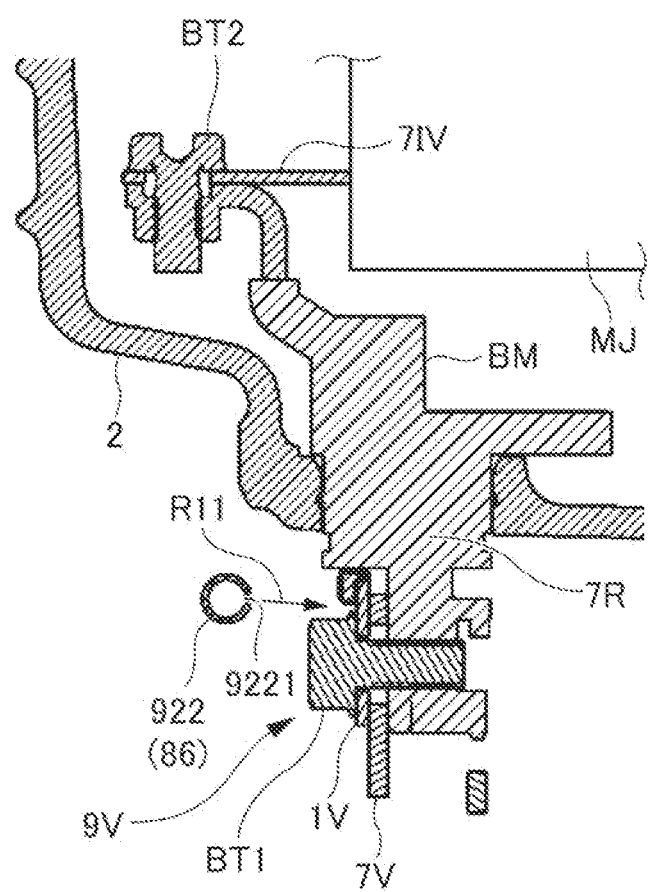
FIG. 6 is a sectional view taken along a line P-P of FIG. 5.

FIG. 3A is a sectional view taken along an axial direction of the vehicle drive device 100. FIG. 3B is a schematic sectional view perpendicular to an axial direction L of the vehicle drive device 100. FIG. 3C is a plan view schematically showing the inverter module MJ housed in a third housing portion 2C. FIG. 4 is a skeleton diagram of the vehicle drive device 100. FIG. 5 is an explanatory diagram of the second branch oil passage 922 shown in FIG. 3A, and is a plan view of a first side wall portion 22 that is viewed in the axial direction. FIG. 6 is a sectional view taken along a line P-P of FIG. 5. In FIG. 6, the inverter module MJ that is not shown in FIG. 5 is schematically shown together. In FIG. 3B, the outer shapes of an input gear 32 and a first counter gear 42 are shown by broken lines, and the outer shapes of a differential input gear 51 and a second counter gear 43 are shown by long dashed short dashed lines.

As shown in FIGS. 3A and 4, the vehicle drive device 100 includes the rotary electric machine 1 serving as a driving force source for wheels W and a drive transmission mechanism 10 provided in a power transmission path P connecting the rotary electric machine 1 and the wheels W. In the present embodiment, the rotary electric machine 1 and the drive transmission mechanism 10 are housed in, for example, the case 2. In the present embodiment, the drive transmission mechanism 10 includes, for example, an input member 3, a counter gear mechanism 4, the differential gear mechanism 5, a first output member 61, and a second output member 62.

The rotary electric machine 1 is arranged on a first axis A1 serving as a rotation axis of the rotary electric machine 1. In the present embodiment, the input member 3 is also arranged on the first axis A1 as an example. The counter gear mechanism 4 is arranged on a second axis A2 serving as a rotation axis of the counter gear mechanism 4. The differential gear mechanism 5 is arranged on a third axis A3 serving as a rotation axis of the differential gear mechanism 5. In the present embodiment, the first output member 61 and the second output member 62 are also arranged on the third axis A3 as an example. The first axis A1, the second axis A2, and the third axis A3 are virtual axes that are different from each other and are arranged in parallel to each other.

In the following description, the direction parallel to the axes A1 to A3 will be referred to as "axial direction L" of the vehicle drive device 100. In the axial direction L, the side where the rotary electric machine 1 is arranged with respect to the input member 3 will be referred to as "first side L1 in axial direction", and the opposite side will be referred to as "second side L2 in axial direction". Further, the direction orthogonal to each of the first axis A1, the second axis A2, and the third axis A3 will be referred to as "radial direction R" with respect to each axis. When it is not necessary to distinguish the axis to be used as a reference, or when the axis to be used as a reference is clear, the direction may be simply referred to as "radial direction R".

As shown in FIG. 3A, in the present embodiment, the case 2 includes, for example, the peripheral wall portion 21, the first side wall portion 22, a second side wall portion 23, and a partition wall portion 24. The peripheral wall portion 21 has a tubular shape that surrounds the outside of the rotary electric machine 1 and the drive transmission mechanism 10 in the radial direction R. The first side wall portion 22 and the second side wall portion 23 are provided to extend along the radial direction R. The first side wall portion 22 is fixed to an end portion of the peripheral wall portion 21 on the first side L1 in the axial direction to close the opening of the peripheral wall portion 21 on the first side L1 in the axial direction. The second side wall portion 23 is fixed to an end portion of the peripheral wall portion 21 on the second side L2 in the axial direction to close the opening of the peripheral wall portion 21 on the second side L2 in the axial direction.

The partition wall portion 24 is provided to partition, in the axial direction L, a space inside the peripheral wall portion 21 in the radial direction R and between the first side wall portion 22 and the second side wall portion 23. In the present embodiment, the rotary electric machine 1 is arranged, for example, between the partition wall portion 24 and the first side wall portion 22. The drive transmission mechanism 10 is arranged between the partition wall portion 24 and the second side wall portion 23. The partition wall portion 24 may define a part of the motor case 1B.

The rotary electric machine 1 includes the stator 11 and a rotor 12. The term "rotary electric machine" is used as a concept including any of a motor (electric motor), a generator (power generator), and a motor generator that functions as both a motor and a generator as necessary.

The stator 11 includes the stator core 111 fixed to a non-rotating member (for example, the case 2). The rotor 12 includes the rotor core 121 that can rotate relative to the stator 11 (stator core 111), and the rotor shaft 122 that is connected to the rotor core 121 to rotate together with the rotor core 121. In the present embodiment, the rotary electric machine 1 is, for example, a revolving field-type rotary electric machine. Therefore, the coil 112 is wound around the stator core 111 to form the coil end portions 112A that protrude from the stator core 111 to both sides in the axial direction L (the first side L1 in the axial direction and the second side L2 in the axial direction). The permanent magnets 123 are provided on the rotor core 121. In the present embodiment, the rotary electric machine 1 is, for example, an inner rotor-type rotary electric machine. Therefore, the rotor core 121 is arranged on the inner side of the stator core 111 in the radial direction R. The rotor shaft 122 is connected to the inner peripheral surface of the rotor core 121.

The rotor shaft 122 rotates about the first axis A1. The rotor shaft 122 has a tubular shape extending along the axial direction L. In the present embodiment, the rotor shaft 122 is, for example, rotatably supported on the case 2 via a first rotor bearing B1a and a second rotor bearing B1b. Specifically, the end portion of the rotor shaft 122 on the first side L1 in the axial direction is rotatably supported on the first side wall portion 22 of the case 2 via the first rotor bearing B1a. The end portion of the rotor shaft 122 on the second side L2 in the axial direction is rotatably supported on the partition wall portion 24 via the second rotor bearing B1b. In the present embodiment, the rotor shaft 122 has, for example, two open end faces in the axial direction L. The internal space of the rotor shaft 122 functions as a rotor shaft oil passage 122a through which oil flows.

The input member 3 is an input element of the drive transmission mechanism 10. The input member 3 includes an input shaft 31 and the input gear 32.

The input shaft 31 is a rotating member that rotates about the first axis A1. The input shaft 31 is formed to extend along the axial direction L. In the present embodiment, the input shaft 31 is, for example, inserted into a through hole extending through the partition wall portion 24 in the axial direction L. The end portion of the input shaft 31 on the first side L1 in the axial direction is connected to the end portion of the rotor shaft 122 on the second side L2 in the axial direction. In the illustrated example, the end portion of the input shaft 31 on the first side L1 in the axial direction is inserted to the end portion of the rotor shaft 122 on the second side L2 in the axial direction such that the input shaft 31 is positioned on the inner side of the rotor shaft 122 in the radial direction R, and the end portions are connected to each other by spline engagement.

In the present embodiment, the input shaft 31 is, for example, rotatably supported on the case 2 via a first input bearing B3a and a second input bearing B3b. Specifically, a portion of the input shaft 31 on the first side L1 in the axial direction with respect to the central portion of the input shaft 31 in the axial direction L and on the second side L2 in the axial direction with respect to the connecting portion with the rotor shaft 122 is rotatably supported on the partition wall portion 24 via the first input bearing B3a. The end portion of the input shaft 31 on the second side L2 in the axial direction is rotatably supported on the second side wall portion 23 via the second input bearing B3b.

In the present embodiment, the input shaft 31 has, for example, a tubular shape with an open end face on the second side L2 in the axial direction. The internal space of the input shaft 31 functions as an input shaft oil passage 31a through which oil from a mechanical hydraulic pump 71 flows.

The input gear 32 is a gear that transmits the driving force from the rotary electric machine 1 to the counter gear mechanism 4. The input gear 32 is connected to the input shaft 31 to rotate together with the input shaft 31. In the present embodiment, the input gear 32 is, for example, formed integrally with the input shaft 31. In the present embodiment, the input gear 32 is arranged, for example, between the first input bearing B3a and the second input bearing B3b.

The counter gear mechanism 4 is arranged between the input member 3 and the differential gear mechanism 5 in the power transmission path P. The counter gear mechanism 4 includes a counter shaft 41, the first counter gear 42, and the second counter gear 43.

The counter shaft 41 is a rotating member that rotates about the second axis A2. The counter shaft 41 is formed to extend along the axial direction L. In the present embodiment, the counter shaft 41 is, for example, rotatably supported on the case 2 via a first counter bearing B4a and a second counter bearing B4b. Specifically, the end portion of the counter shaft 41 on the first side L1 in the axial direction is rotatably supported on the partition wall portion 24 via the first counter bearing B4a. The end portion of the counter shaft 41 on the second side L2 in the axial direction is rotatably supported on the second side wall portion 23 via the second counter bearing B4b.

In the present embodiment, the counter shaft 41 has, for example, a tubular shape with two open end faces in the axial direction L. The internal space of the counter shaft 41 functions as a counter shaft oil passage 41a through which the oil from the mechanical hydraulic pump 71 flows.

The first counter gear 42 is an input element of the counter gear mechanism 4. The first counter gear 42 meshes with the input gear 32 of the input member 3. The first counter gear 42 is connected to the counter shaft 41 to rotate together with the counter shaft 41. In the present embodiment, the first counter gear 42 is, for example, connected to the counter shaft 41 by spline engagement. In the present embodiment, as shown in FIG. 3A, the first counter gear 42 is arranged, for example, between the first counter bearing B4a and the second counter bearing B4b and on the first side L1 in the axial direction with respect to the second counter gear 43. In a modified example, the first counter gear 42 may be arranged between the first counter bearing B4a and the second counter bearing B4b and on the second side L2 in the axial direction with respect to the second counter gear 43 (see FIG. 4).

The second counter gear 43 is an output element of the counter gear mechanism 4. In the present embodiment, the second counter gear 43 has, for example, a smaller diameter than the first counter gear 42. The second counter gear 43 is connected to the counter shaft 41 to rotate together with the counter shaft 41. In the present embodiment, the second counter gear 43 is, for example, formed integrally with the counter shaft 41.

The differential gear mechanism 5 distributes the driving force transmitted from the rotary electric machine 1 side to the first output member 61 and the second output member 62. The differential gear mechanism 5 includes the differential input gear 51, a differential case 52, a pinion shaft 53, a pair of pinion gears 54, a first side gear 55, and a second side gear 56. In the present embodiment, all of the pair of pinion gears 54, the first side gear 55, and the second side gear 56 are, for example, bevel gears.

The differential input gear 51 is an input element of the differential gear mechanism 5. The differential input gear 51 meshes with the second counter gear 43 of the counter gear mechanism 4. The differential input gear 51 is connected to the differential case 52 to rotate together with the differential case 52. In the present embodiment, the rotary electric machine 1 is, for example, arranged on the first side L1 in the axial direction with respect to the differential input gear 51.

The differential case 52 is a rotating member that rotates about the third axis A3. In the present embodiment, the differential case 52 is, for example, rotatably supported on the case 2 via a first differential bearing B5a and a second differential bearing B5b. Specifically, the end portion of the differential case 52 on the first side L1 in the axial direction is rotatably supported on the partition wall portion 24 via the first differential bearing B5a. The end portion of the differential case 52 on the second side L2 in the axial direction is rotatably supported on the second side wall portion 23 via the second differential bearing B5b.

The differential case 52 is a hollow member. The differential case 52 houses the pinion shaft 53, the pair of pinion gears 54, the first side gear 55, and the second side gear 56.

The pinion shaft 53 extends along the radial direction R with respect to the third axis A3. The pinion shaft 53 is inserted into the pair of pinion gears 54 and supports the pinion gears 54 such that the pinion gears 54 are rotatable. The pinion shaft 53 is arranged through the differential case 52. The pinion shaft 53 is locked to the differential case 52 by, for example, a locking member (not shown) in the form of a rod-shaped pin, and rotates together with the differential case 52.

The pair of pinion gears 54 is attached to the pinion shaft 53 such that the pinion gears 54 face each other while being spaced along the radial direction R with respect to the third axis A3. The pair of pinion gears 54 is rotatable about the pinion shaft 53 and rotatable (revolvable) about the third axis A3.

The first side gear 55 and the second side gear 56 are rotation elements after distribution in the differential gear mechanism 5. The first side gear 55 and the second side gear 56 are arranged to face each other with the pinion shaft 53 interposed therebetween while being spaced in the axial direction L. The first side gear 55 is arranged on the first side L1 in the axial direction with respect to the second side gear 56. The first side gear 55 and the second side gear 56 are each configured to rotate in a circumferential direction in the internal space of the differential case 52. The first side gear 55 and the second side gear 56 mesh with the pair of pinion gears 54. The first side gear 55 is connected to the first output member 61 to rotate together with the first output member 61. The second side gear 56 is connected to the second output member 62 to rotate together with the second output member 62.

The first output member 61 and the second output member 62 are drivingly connected to the wheels W. Each of the first output member 61 and the second output member 62 transmits the driving force distributed by the differential gear mechanism 5 to the wheel W.

In the present embodiment, the first output member 61 includes, for example, a first axle 611 and a relay member 612. The first axle 611 is drivingly connected to the wheel W on the first side L1 in the axial direction. The relay member 612 is a rotating member that rotates about the third axis A3. The relay member 612 is a shaft member extending in the axial direction L. The relay member 612 is inserted into a through hole extending through the partition wall portion 24 in the axial direction L. The relay member 612 is rotatably supported on the first side wall portion 22 of the case 2 via an output bearing B6. The end portion of the relay member 612 on the first side L1 in the axial direction is exposed to the outside of the case 2 through a through hole extending through the first side wall portion 22 of the case 2 in the axial direction L. The end portion of the relay member 612 on the first side L1 in the axial direction is connected to the first axle 611 to rotate together with the first axle 611. In the present embodiment, the relay member 612 has, for example, a tubular shape with an open end face on the first side L1 in the axial direction. The inner peripheral surface of the relay member 612 and the outer peripheral surface of the end portion of the first axle 611 on the second side L2 in the axial direction have mating splines. The relay member 612 and the first axle 611 are connected to rotate together when the splines are engaged with each other. The end portion of the relay member 612 on the second side L2 in the axial direction is connected to the first side gear 55 of the differential gear mechanism 5 to rotate together with the first side gear 55. In the present embodiment, for example, the outer peripheral surface of the end portion of the relay member 612 on the second side L2 in the axial direction and the inner peripheral surface of the first side gear 55 have mating splines. The relay member 612 and the first side gear 55 are connected to rotate together when the splines are engaged with each other.

In the present embodiment, the second output member 62 includes, for example, a second axle 621. The second axle 621 is drivingly connected to the wheel W on the second side L2 in the axial direction. The second axle 621 is connected to the second side gear 56 to rotate together with the second side gear 56. In the present embodiment, for example, the outer peripheral surface of the end portion of the second axle 621 on the first side L1 in the axial direction and the inner peripheral surface of the second side gear 56 have mating splines. The second axle 621 and the second side gear 56 are connected to rotate together when the splines are engaged with each other.

Positional relationships among the rotary electric machine 1, the input member 3, the counter gear mechanism 4, the differential gear mechanism 5, and the inverter module MJ will be described with reference to FIGS. 3B and 3C. In the description with reference to FIGS. 3B and 3C, the vertical direction of the vehicle drive device 100 mounted on the vehicle will be referred to as "up-down direction V". The upper position in the up-down direction V is represented by using "up", for example, above, upper end, and the like, and the lower position in the up-down direction V is represented by using "down", for example, below, lower end, and the like. A direction orthogonal to the axial direction L when viewed in the up-down direction V will be referred to as "depth direction D". In the depth direction D, the differential gear mechanism 5 side with respect to the rotary electric machine 1 will be referred to as "front side D1", and the opposite side from the front side D1 will be referred to as "rear side D2".

As shown in FIG. 3B, the axis (A2) of the counter gear mechanism 4 is arranged below both the axis (A1) of the rotary electric machine 1 and the axis (A3) of the differential gear mechanism 5. In the example shown in FIG. 3B, the first axis A1, the second axis A2, and the third axis A3 are arranged in the order of the first axis A1, the third axis A3, and the second axis A2 from above.

The inverter module MJ is arranged on the first side L1 in the axial direction with respect to the differential input gear 51 of the differential gear mechanism 5. The inverter module MJ is arranged above the axis (A3) of the differential gear mechanism 5. As shown in FIG. 3B, the inverter module MJ is arranged at a position where the inverter module MJ overlaps the differential input gear 51 when viewed in the axial direction L. Regarding the arrangement of two elements, the phrase "overlap when viewed in a specific direction" means that, when a virtual straight line parallel to the specific direction is moved in directions orthogonal to the virtual straight line, there is at least a region where the virtual straight line intersects both the two elements. In FIG. 3B, the outer shapes of the input gear 32 and the first counter gear 42 are shown by broken lines, and the outer shapes of the differential input gear 51 and the second counter gear 43 are shown by long dashed short dashed lines.

A part of the inverter module MJ is arranged between the rotary electric machine 1 and the differential input gear 51 in the axial direction L. A part of the inverter module MJ is arranged at a position where the inverter module MJ overlaps the counter gear mechanism 4 when viewed in the up-down direction V. As shown in FIG. 3B, the inverter module MJ may be arranged at a position where the inverter module MJ overlaps the rotary electric machine 1 when viewed in the axial direction L.

As shown in FIG. 3B, in the present embodiment, for example, a counter gear lower end 4a that is the lowermost end of the counter gear mechanism 4 is arranged at the same position as or above, in the up-down direction V, a differential gear lower end 5a that is the lowermost end of the differential gear mechanism 5. In the illustrated example, the counter gear lower end 4a is arranged above the differential gear lower end 5a. In the present embodiment, the counter gear lower end 4a is, for example, the lower end of the first counter gear 42. The differential gear lower end 5a is the lower end of the differential input gear 51.

In the present embodiment, for example, a module upper end 7a that is the uppermost end of the inverter module MJ is arranged at the same position or below, in the up-down direction V, a rotary electric machine upper end 1a that is the uppermost end of the rotary electric machine 1. In the illustrated example, the module upper end 7a and the rotary electric machine upper end 1a are arranged at the same position in the up-down direction V. In the present embodiment, the rotary electric machine upper end 1a is, for example, the upper end of the outer peripheral surface of the stator core 111.

As shown in FIG. 3B, in the present embodiment, for example, the case 2 has a first housing portion 2A defining a space for housing the rotary electric machine 1 (corresponding to the space SP1 in FIG. 2), a second housing portion 2B for housing the differential gear mechanism 5, and the third housing portion 2C for housing the inverter module MJ. The third housing portion 2C is a space that does not communicate with the first housing portion 2A and the second housing portion 2B, and defines a space closed to the outside (corresponding to the closed space SP2 in FIG. 2). The third housing portion 2C may be defined by the peripheral wall portion 21. The third housing portion 2C has an opening at the upper portion to house the inverter module MJ from above. This opening is closed by the lid member (see the lid member 25 in FIG. 2) in a state in which the inverter module MJ is housed in the third housing portion 2C.

In the present embodiment, the inverter module MJ is arranged, for example, below an upper one of a first uppermost end 2Aa that is the uppermost end of the first housing portion 2A and a second uppermost end 2Ba that is the uppermost end of the second housing portion 2B. In the illustrated example, the first uppermost end 2Aa is positioned above the second uppermost end 2Ba. The inverter module MJ is arranged below the first uppermost end 2Aa. In the present embodiment, the inverter module MJ is arranged, for example, between a first outermost depth end 2Ab that is the outermost end of the first housing portion 2A in the depth direction D and a second outermost depth end 2Bb that is the outermost end of the second housing portion 2B in the depth direction D. In other words, the inverter module MJ is arranged between the outermost ends of the first housing portion 2A and the second housing portion 2B in the depth direction D. In the illustrated example, the first outermost depth end 2Ab is the outermost end of the first housing portion 2A on the rear side D2. The second outermost depth end 2Bb is the outermost end of the second housing portion 2B on the front side D1.

As shown in FIG. 3C, in the present embodiment, the inverter module MJ is arranged, for example, between a first outermost axial end 2Ac that is the outermost end of the first housing portion 2A in the axial direction L and a second outermost axial end 2Bc that is the outermost end of the second housing portion 2B in the axial direction L. In other words, the inverter module MJ is arranged between the outermost ends of the first housing portion 2A and the second housing portion 2B in the axial direction L. In the illustrated example, the first outermost axial end 2Ac is the outermost end of the first housing portion 2A on the first side L1 in the axial direction. The second outermost axial end 2Bc is the outermost end of the second housing portion 2B on the second side L2 in the axial direction.

A terminal block that is a member for holding the bus bars 7U, 7V, and 7W connecting the power lines 1U, 1V, and 1W of the rotary electric machine 1 and the inverter module MJ is supported by the case 2 of the rotary electric machine 1 (for example, the peripheral wall portion 21). If the heat of the bus bars 7U, 7V, and 7W is not easily released into the air in a bus bar path from the case 2 to the inverter module MJ, the temperature of the terminal block is likely to increase. The bus bar path where the heat of the bus bars 7U, 7V, and 7W is not easily released into the air is likely to be formed in a case where the case of the rotary electric machine 1 and the case of the inverter module MJ are adjacent or close to each other or in a case of an integrated case.

Therefore, in the case of the case 2 as in the present embodiment, the temperature of the terminal block (for example, see a bus bar module BM of FIG. 3A described later) is likely to increase. According to the present embodiment, however, the power lines 1U, 1V, and 1W and the bus bars 7U, 7V, and 7W can effectively be cooled as described above. Thus, the temperature increase in the terminal block can be prevented appropriately. That is, according to the present embodiment, the temperature increase in the terminal block can be prevented appropriately even in the case of using the case 2 integrally formed to have the rotary electric machine 1 and the inverter module MJ inside.

Next, an oil-related structure will be described with reference to FIGS. 3A, 5, and 6.

As schematically shown in FIG. 3A, the vehicle drive device 100 includes the mechanical hydraulic pump 71 to be driven by a driving force transmitted through the power transmission path P, and the electric hydraulic pump 72 to be driven by a dedicated driving force source independent of the power transmission path P. Each of the mechanical hydraulic pump 71 and the electric hydraulic pump 72 is a pump that pumps up oil stored in an oil storage portion in the case 2 and discharges the pumped oil.

In the present embodiment, the mechanical hydraulic pump 71 is, for example, housed in the case 2. In the present embodiment, the mechanical hydraulic pump 71 is, for example, driven by the rotation of the rotating members included in the drive transmission mechanism 10. The mechanical hydraulic pump 71 may be, for example, a gear pump.

As described above, in the present embodiment, the mechanical hydraulic pump 71 is, for example, driven by the rotation of the differential case 52 of the differential gear mechanism 5. The rotation speed of the differential case 52 is lower than the rotation speed of the rotary electric machine 1 and the rotation speed of the counter gear mechanism 4. Therefore, in the structure in which the mechanical hydraulic pump 71 is driven by the rotation of the differential case 52, the rotation speed of the mechanical hydraulic pump 71 can be kept low as compared with a structure in which the mechanical hydraulic pump 71 is driven by the rotary electric machine 1 or the counter gear mechanism 4. As a result, energy loss due to high-speed rotation of the mechanical hydraulic pump 71 can be reduced to a low level.

As schematically shown in FIG. 3A, in the present embodiment, the electric hydraulic pump 72 is, for example, an electric hydraulic pump to be driven by an electric motor (not shown). As the electric motor, for example, an alternating-current rotary electric machine to be driven by alternating-current power of a plurality of phases can be used.

In the present embodiment, the electric hydraulic pump 72 is stopped, for example, when the temperature of the cooling target portion CP of the rotary electric machine 1 is equal to or lower than a specified value. In a case where a plurality of portions is included in the cooling target portion CP, an average value, a maximum value, and the like among those portions can be adopted as the "temperature of the cooling target portion CP". The cooling target portion CP includes an outer peripheral surface 111a of the stator core 111, an inner peripheral surface 122d of the rotor shaft 122, and the coil end portions 112A. In a modified example, the electric hydraulic pump 72 may be stopped based on other conditions related to an operation status of the rotary electric machine 1.

The vehicle drive device 100 includes a lubricating oil passage 91 and the oil passage 92 that are independent of each other.

The lubricating oil passage 91 is an oil passage through which the oil discharged from the mechanical hydraulic pump 71 is supplied to a plurality of bearings that rotatably supports the rotor shaft 122 of the rotary electric machine 1 and various rotating members included in the drive transmission mechanism 10. The lubricating oil passage 91 includes the input shaft oil passage 31a, the counter shaft oil passage 41a, and the like described above. The oil supplied to the input shaft oil passage 31a is used for lubrication of the second rotor bearing B1b, the first input bearing B3a, and the like. The oil supplied to the counter shaft oil passage 41a is used for lubrication of the first counter bearing B4a, the second counter bearing B4b, and the like.

As described above, the oil passage 92 includes the cooling oil passage 921 and the second branch oil passage 922 (an example of the second oil passage portion). The cooling oil passage 921 includes the third branch oil passage 923 on a downstream side with respect to the branch point from the second branch oil passage 922, and a portion on an upstream side with respect to the branch point from the second branch oil passage 922 is an example of the first oil passage portion.

As described above with reference to FIG. 2, the cooling oil passage 921 is an oil passage through which the oil discharged from the electric hydraulic pump 72 is supplied to the cooling target portion CP inside the rotary electric machine 1.

In the example shown in FIG. 3A, the third branch oil passage 923 of the cooling oil passage 921 includes the rotor shaft oil passage 122a that is a hollow inside the rotor shaft 122. The third branch oil passage 923 of the cooling oil passage 921 further includes a first supply hole 82b as a dropping hole for dropping the oil onto the coil end portion 112A. The first supply hole 82b may be provided for each of the coil end portions 112A on both sides in the axial direction. Further details of the structure of the cooling oil passage 921 shown in FIG. 3A will be described later in description of an oil flow.

As described above with reference to FIG. 2, the second branch oil passage 922 is an oil passage that communicates with the cooling oil passage 921 and through which a part of the oil discharged from the electric hydraulic pump 72 to the cooling oil passage 921 is supplied toward at least one of the power lines 1U, 1V, and 1W and the bus bars 7U, 7V, and 7W.

In the example shown in FIG. 3A, the second branch oil passage 922 is defined by a tubular member 86. The tubular member 86 may be made of, for example, a metal. The tubular member 86 has, for example, a closed circular shape in cross section, but the sectional shape is arbitrary as long as the shape is a closed shape. The tubular member 86 may be realized by a single member or may be realized by connecting a plurality of members.

A first end of the tubular member 86 is supported by the first side wall portion 22. In the tubular member 86, the end portion on the first side wall portion 22 side communicates with the cooling oil passage 921 (cooling oil passage 22b) formed in the first side wall portion 22. A second end of the tubular member 86 is supported by the case 2. Although illustration is omitted for how the second end side of the tubular member 86 is supported, the second end may be supported by the case 2 in an arbitrary manner. For example, the tubular member 86 may be welded to the case 2 or fixed via a bracket. The second end side of the tubular member 86 is closed. That is, in the tubular member 86, the end portion on the first side wall portion 22 side is open and the second end side is closed.

As shown in FIG. 3A, the tubular member 86 is arranged through the vicinity of the bus bars 7U, 7V, and 7W. Specifically, the tubular member 86 extends from the first end on the first side wall portion 22 side toward the first side L1 in the axial direction, and bends outward in the radial direction R with respect to the axis A1 in the middle. The tubular member 86 further extends outward in the radial direction R with respect to the axis A1 through the vicinity of the bus bars 7U, 7V, and 7W.

In the example shown in FIG. 3A, the bus bars 7U, 7V, and 7W are incorporated in the bus bar module BM in the form of the terminal block. That is, the bus bar module BM is a module in which the bus bars 7U, 7V, and 7W are sealed with a resin portion 7R (see FIG. 6). The bus bar module BM may be formed by insert molding of a resin. The bus bar module BM may be fixed to, for example, the peripheral wall portion 21.

As shown in FIGS. 3A and 6, the tubular member 86 has ejection holes 9221 for ejecting the oil toward the bus bar module BM. The phrase "ejecting the oil toward the bus bar module BM" has a different meaning from the indirect guide of the oil to the bus bar module BM along a certain object, and typically means that the oil is released into the air and directly applied to the bus bar module BM.

By using such ejection holes 9221, the bus bar module BM can be arranged in the air having a relatively large volume (that is, in the space where the rotary electric machine 1 is housed) and the heat release into the air can be promoted as compared with, for example, a comparative structure in which the bus bar module BM is arranged in the second branch oil passage 922 defined by the tubular member 86.

By using the ejection holes 9221, a sufficient amount of oil can easily be supplied to the bus bar module BM. Specifically, in the case where the ejection holes 9221 are used, the oil ejected from the ejection holes 9221 impinges on the bus bar module BM without passing through other members. Therefore, the amount of the oil that impinges on the bus bar module BM can easily be managed (controlled). That is, the amount of the oil flowing in the tubular member 86 is substantially equal to the amount of the oil that impinges on the bus bar module BM. Therefore, the amount of the oil that impinges on the bus bar module BM can easily be managed (controlled) by managing (controlling) the amount of the oil flowing in the tubular member 86.

In a case where the junctions 9U, 9V, and 9W are immersed in the oil or in a structure in which the lubricating oil is applied to the junctions 9U, 9V, and 9W by stirring up the oil, the oil adhering to the junctions 9U, 9V, and 9W is likely to stay, and a problem of corrosion is likely to occur. In the case of oil ejection through the ejection holes 9221, such a problem can be reduced.

One ejection hole 9221 may be provided in association with each of the bus bars 7U, 7V, and 7W, or a plurality of ejection holes 9221 may be provided in association with each of the bus bars 7U, 7V, and 7W. In the example shown in FIG. 6, the ejection hole 9221 is formed to eject the oil toward the junction 9V between the power line 1V and the bus bar 7V. Specifically, in the example shown in FIG. 6, the power line 1V and the bus bar 7V are joined by tightening a bolt BT1, and the ejection hole 9221 is positioned above an axis of the bolt BT1. In this case, the oil can be applied from the vicinity of an upper end portion of a region where the power line 1V and the bus bar 7V overlap each other. Therefore, the power line 1V and the bus bar 7V can be cooled efficiently. That is, when the oil flowing downward along the power line 1V and the bus bar 7V removes heat from the power line 1V and the bus bar 7V, the range of the oil flow (the range of flow along the power line 1V and the bus bar 7V) is relatively long. Therefore, the power line 1V and the bus bar 7V can be cooled effectively at the same time.

The oil discharged from the electric hydraulic pump 72 is supplied to the cooling oil passage 921 and accordingly to the second branch oil passage 922. Therefore, the amount of the oil to be supplied to the second branch oil passage 922 can be adjusted by controlling an operation status of the electric hydraulic pump 72.

By using the tubular member 86, the degree of freedom in terms of the layout of the second branch oil passage 922 is higher than that in a case of using an oil passage in the case. As a result, a second branch oil passage 922 capable of effectively cooling the power line and the bus bar can easily be established even for various layouts of the power line and the bus bar.

Next, a flow of the oil in the oil passage 92 will be described with reference to FIGS. 3A and 6. FIGS. 3A and 6 schematically show the oil flow by arrows R0 to R11.

As shown in FIG. 3A, the electric hydraulic pump 72 sucks the oil introduced via the strainer 74 into an inlet oil passage 23a formed in the second side wall portion 23 (arrow R0). The oil discharged from the electric hydraulic pump 72 is cooled by the oil cooler 73. The oil cooler 73 has, for example, a pipe through which the oil flows, and is configured to cool the oil by exchanging heat between refrigerant (for example, coolant or air) flowing outside the pipe and the oil inside the pipe. Thus, in the present embodiment, the oil cooler 73 for cooling the oil is provided in, for example, the cooling oil passage 921. The oil cooler for cooling the oil is not provided in the lubricating oil passage 91.

The oil cooled by the oil cooler 73 is introduced into an inlet oil passage 23b formed in the second side wall portion 23 (arrow R1), passes through an oil passage 24a formed in the partition wall portion 24, and is supplied to the cooling oil passage 22b formed in the first side wall portion 22 of the case 2 (arrows R2 and R3). The oil supplied to the cooling oil passage 22b flows inward in the radial direction R with respect to the axis A1 (arrow R4), and is diverted to the second branch oil passage 922 in the middle (arrow R6). The oil flowing through the cooling oil passage 22b (third branch oil passage 923) without being diverted to the second branch oil passage 922 (arrow R5) is diverted to a first connecting oil passage 22c at a position on the axis A1 (arrow R7). The oil flowing through the cooling oil passage 22b without being diverted to the first connecting oil passage 22c (arrow R8) flows into a second connecting oil passage 22d connected to an outer supply oil passage 82a.

The oil flowing into the second branch oil passage 922 is ejected toward the bus bar module BM via the ejection holes 9221, and is applied to the bus bars 7U, 7V, and 7W and the power lines 1U, 1V, and 1W of the rotary electric machine 1. As a result, the bus bars 7U, 7V, and 7W and the power lines 1U, 1V, and 1W in the bus bar module BM are cooled. As shown in FIG. 6, the bus bars 7U, 7V, and 7W of the bus bar module BM are joined to the bus bars of the inverter module MJ (see a bus bar 7IV of FIG. 6). Therefore, the bus bar module BM can also be cooled via the bus bars 7U, 7V, and 7W. In FIG. 6, the bus bar 7IV of the inverter module MJ is joined to the bus bar 7V of the bus bar module BM by tightening a bolt BT2.

The oil flowing into the first connecting oil passage 22c is supplied to the rotor shaft oil passage 122a (inner peripheral surface 122d of the rotor shaft 122) through the first connecting oil passage 22c. The oil may be supplied to the rotor shaft oil passage 122a via a tubular member (not shown) connected to the first connecting oil passage 22c. The oil supplied to the inner peripheral surface 122d of the rotor shaft 122 cools the permanent magnets 123 by exchanging heat with the permanent magnets 123 via the rotor shaft 122 and the rotor core 121. In this case, the cooling target portion CP includes the inner peripheral surface 122d of the rotor shaft 122 and the permanent magnets 123.

A part of the oil supplied to the rotor shaft oil passage 122a flows into each of a first supply oil passage 122b and a second supply oil passage 122c formed through the rotor shaft 122 in the radial direction R. The first supply oil passage 122b is formed at a position where the first supply oil passage 122b overlaps the coil end portion 112A on the first side L1 in the axial direction when viewed in the radial direction R of the rotor shaft 122. The second supply oil passage 122c is formed at a position where the second supply oil passage 122c overlaps the coil end portion 112A on the second side L2 in the axial direction when viewed in the radial direction R of the rotor shaft 122. Therefore, as the rotor shaft 122 rotates, the oil is ejected from each of the first supply oil passage 122b and the second supply oil passage 122c toward the corresponding coil end portion 112A. The oil adhering to the coil end portions 112A cools the coil end portions 112A. In this case, the cooling target portion CP includes the coil end portions 112A.

The oil flowing into the second connecting oil passage 22d is supplied to the outer supply oil passage 82a through the second connecting oil passage 22d. The outer supply oil passage 82a is an oil passage formed in an outer supply member 82. The outer supply member 82 is arranged above the rotary electric machine 1 in the vertical direction. Specifically, the outer supply member 82 is arranged above the coil end portions 112A and the stator core 111 in the vertical direction. The outer supply member 82 is formed to extend in the axial direction L. The outer supply member 82 has a tubular shape with an open end face on the first side L1 in the axial direction. The internal space of the outer supply member 82 functions as the outer supply oil passage 82a. The end portion of the outer supply member 82 on the first side L1 in the axial direction is supported by the first side wall portion 22 such that the outer supply oil passage 82a and the second connecting oil passage 22d communicate with each other. The end portion of the outer supply member 82 on the second side L2 in the axial direction is supported by the partition wall portion 24.

The oil supplied to the outer supply oil passage 82a flows through the outer supply oil passage 82a toward the second side L2 in the axial direction. Then, the oil in the outer supply oil passage 82a falls through the first supply holes 82b and second supply holes 82c formed through the outer supply member 82 in the radial direction R.

The first supply holes 82b are arranged at a plurality of (two in the illustrated example) locations in the axial direction L to overlap the coil end portion 112A on the first side L1 in the axial direction and the coil end portion 112A on the second side L2 in the axial direction when viewed in the vertical direction. A plurality of first supply holes 82b is arranged with intervals in a circumferential direction of the outer supply member 82. Therefore, a part of the oil in the outer supply oil passage 82a drops onto the coil end portions 112A through the first supply holes 82b. The oil adhering to the coil end portions 112A cools the coil end portions 112A.

The second supply holes 82c are arranged at positions where the second supply holes 82c overlap the stator core 111 when viewed in the vertical direction. In the illustrated example, the second supply holes 82c are arranged at a plurality of (two in the illustrated example) locations in the axial direction L. A plurality of second supply holes 82c is arranged with intervals in the circumferential direction of the outer supply member 82. Therefore, a part of the oil in the outer supply oil passage 82a drops onto the outer peripheral surface 111a of the stator core 111 through the second supply holes 82c. The oil dropped onto the outer peripheral surface 111a of the stator core 111 cools the coil 112 wound around the stator core 111 by exchanging heat with the coil 112 via the stator core 111. In this case, the cooling target portion CP includes the outer peripheral surface 111a of the stator core 111.

According to the example shown in FIG. 3A, the bus bars 7U, 7V, and 7W and the power lines 1U, 1V, and 1W together with the cooling target portion CP inside the rotary electric machine 1 can effectively be cooled via the cooling oil passage 921 and the second branch oil passage 922 based on the oil discharged by the electric hydraulic pump 72. As a result, it is possible to realize efficient oil cooling for the entire vehicle drive device 100 by utilizing the oil from the electric hydraulic pump 72.

According to the example shown in FIG. 3A, the lubricating oil passage 91 and the cooling oil passage 921 are provided independently of each other. Therefore, in the vehicle drive device 100, the hydraulic circuit for lubrication and the hydraulic circuit for cooling are independent of each other. As a result, when it is not necessary to supply the oil to either one of the hydraulic circuit for lubrication and the hydraulic circuit for cooling, it is possible to avoid supplying the oil to both of them. For example, when the vehicle including the vehicle drive device 100 is traveling at high speed and the rotary electric machine 1 has a low load, the supply of the oil from the electric hydraulic pump 72 to the cooling target portion CP can be stopped. As a result, energy loss due to unnecessary driving of the electric hydraulic pump 72 can be reduced to a low level.

The temperature of the lubricating oil used for cooling or lubricating the rotary electric machine 1 is likely to increase when the output of the rotary electric machine 1 is relatively high. When the temperature of the lubricating oil increases, the cooling capacity of the lubricating oil decreases. Therefore, the lubricating oil passage 91 and the cooling oil passage 921 are provided separately. Thus, it is possible to prevent the inconvenience (insufficient cooling capacity) that may occur when the lubricating oil in the lubricating oil passage 91 is used for cooling the power lines 1U, 1V, and 1W and the bus bars 7U, 7V, and 7W.

In the example shown in FIG. 3A, the amount of the oil to be distributed to the second branch oil passage 922 in the oil discharged by the electric hydraulic pump 72 may be adjusted based on the opening areas of the first supply oil passage 122b, the second supply oil passage 122c, the first supply holes 82b, the second supply holes 82c, and the ejection holes 9221. For example, the amount of the oil to be distributed to the second branch oil passage 922 may be adjusted based on a relationship between the total $\alpha 2$ of the opening areas of the first supply oil passage 122b, the second supply oil passage 122c, the first supply holes 82b, and the second supply holes 82c and the total area $\alpha 1$ of the ejection holes 9221 (for example, a ratio "$\alpha 1/(\alpha 1+\alpha 2)$"). In this case, the ratio "$\alpha 1/(\alpha 1+\alpha 2)$" is preferably 0.3 or less, and more preferably about 0.1 as described above. In this case, the cooling target portion CP inside the rotary electric machine 1, the power lines 1U, 1V, and 1W of the rotary electric machine 1, and the bus bars 7U, 7V, and 7W can efficiently be cooled by distributing the oil from the electric hydraulic pump 72 at an appropriate ratio.

In the example shown in FIG. 3A, the second branch oil passage 922 is defined by the single tubular member 86, but two or more tubular members 86 may communicate with the cooling oil passage 921 in parallel. A tubular member for cooling another cooling target portion (a tubular member other than the tubular member 86) may communicate with the cooling oil passage 921.

Although each embodiment has been described in detail above, the present disclosure is not limited to the specific embodiments, and various modifications and changes can be made within the scope of the claims. Further, it is possible to combine all or a plurality of the constituent elements of the embodiments described above.

For example, in the embodiment described above, the oil supply unit 8 includes the electric hydraulic pump 72, but a mechanical hydraulic pump may be used instead of the electric hydraulic pump 72.

In the embodiment described above, the oil supply unit 8 includes the oil cooler 73, but the oil cooler 73 may be omitted. Further, the oil cooler 73 may be provided at an arbitrary location. For example, the oil cooler 73 may be provided in the inverter case portion 2a. In this case, the oil cooler 73 may be realized by using a coolant passage extending through the inverter module MJ. Specifically, the oil passage 92 may extend to the inside of the inverter case portion 2a and adjoin the coolant passage extending through the inverter module MJ to reduce the temperature of the oil flowing through the oil passage 92. In this case, the heat of the coolant circulating in the coolant passage may be released by a radiator. Alternatively, in a case where the rotary electric machine 1 is water-cooled, the oil cooler 73 may be realized by using a coolant for such water cooling.

DESCRIPTION OF THE REFERENCE NUMERALS

100 . . . vehicle drive device, 1 . . . rotary electric machine, 2 . . . case, 21 . . . peripheral wall portion (partition wall), 1U, 1V, 1W . . . power line, 7U, 7V, 7W . . . bus bar, junction . . . 9U, 9V, 9W, 11 . . . stator, 112 . . . coil, 121 . . . rotor core, 122 . . . rotor shaft, 122a . . . rotor shaft oil passage (hollow), 72 . . . electric hydraulic pump (hydraulic pump), 721 . . . pump motor, 73 . . . oil cooler, 92 . . . oil passage, 921 . . . cooling oil passage (first oil passage portion), 922 . . . second branch oil passage (second oil passage portion), 923 . . . third branch oil passage (third oil passage portion), 82b . . . first supply hole (dropping hole), 9221 . . . ejection hole, IV . . . inverter (power converter), HB . . . high-voltage battery (power supply), BT1 . . . bolt, SP1 . . . space (first housing chamber), SP2 . . . closed space (second housing chamber)

The invention claimed is:
1. A vehicle drive device comprising:
a case;
a rotary electric machine provided in the case and including a power line electrically connected to a power supply via a power converter;

a bus bar extending inside the case and joined to the power line;
a hydraulic pump; and
an oil passage including an ejection hole through which oil discharged from the hydraulic pump is ejected toward at least one of the power line and the bus bar, wherein:
  a rotor core of the rotary electric machine is provided around a hollow rotor shaft;
  a coil electrically connected to the power line is wound around a stator of the rotary electric machine;
  the oil passage includes
    a first oil passage portion, and
    a second oil passage portion and a third oil passage portion connected to the first oil passage portion;
  both the second oil passage portion and the third oil passage portion are downstream of the first oil passage portion and are configured to receive the oil from the first oil passage portion;
  the second oil passage portion supplies the oil toward at least one of the power line and the bus bar; and
  the third oil passage portion includes a hollow inside the rotor shaft, and has a dropping hole through which the oil drops onto the coil.

2. The vehicle drive device according to claim 1, wherein the hydraulic pump includes a pump motor, and supplies the oil cooled by an oil cooler to the oil passage.

3. The vehicle drive device according to claim 2, wherein:
the power line and the bus bar are joined by tightening a bolt;
the second oil passage portion includes an ejection hole through which the oil is ejected toward a junction between the power line and the bus bar; and
the ejection hole is positioned above an axis of the bolt.

4. The vehicle drive device according to claim 3, wherein:
the case is integrally formed to have a first housing chamber for housing the rotary electric machine and a second housing chamber for housing the power converter, and includes a partition wall that separates the first housing chamber and the second housing chamber; and
the bus bar is arranged through the partition wall.

5. The vehicle drive device according to claim 2, wherein:
the case is integrally formed to have a first housing chamber for housing the rotary electric machine and a second housing chamber for housing the power converter, and includes a partition wall that separates the first housing chamber and the second housing chamber; and
the bus bar is arranged through the partition wall.

6. The vehicle drive device according to claim 1, wherein:
the power line and the bus bar are joined by tightening a bolt;
the second oil passage portion includes an ejection hole through which the oil is ejected toward a junction between the power line and the bus bar; and
the ejection hole is positioned above an axis of the bolt.

7. The vehicle drive device according to claim 6, wherein:
the case is integrally formed to have a first housing chamber for housing the rotary electric machine and a second housing chamber for housing the power converter, and includes a partition wall that separates the first housing chamber and the second housing chamber; and
the bus bar is arranged through the partition wall.

8. The vehicle drive device according to claim 1, wherein:
the case is integrally formed to have a first housing chamber for housing the rotary electric machine and a second housing chamber for housing the power converter, and includes a partition wall that separates the first housing chamber and the second housing chamber; and
the bus bar is arranged through the partition wall.

* * * * *